(12) United States Patent
Guo et al.

(10) Patent No.: US 9,134,754 B2
(45) Date of Patent: Sep. 15, 2015

(54) FIXING APPARATUS FOR A HARD DISK

(71) Applicant: Wistron Corporation, New Taipei (TW)

(72) Inventors: Xiu-Qing Guo, New Taipei (TW); X-Zhang Ivan, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 229 days.

(21) Appl. No.: 13/835,738

(22) Filed: Mar. 15, 2013

(65) Prior Publication Data
US 2013/0301211 A1 Nov. 14, 2013

(30) Foreign Application Priority Data
May 8, 2012 (CN) .......................... 2012 1 0140370

(51) Int. Cl.
*G06F 1/16* (2006.01)
*G06F 1/18* (2006.01)

(52) U.S. Cl.
CPC . *G06F 1/16* (2013.01); *G06F 1/187* (2013.01)

(58) Field of Classification Search
CPC .................................. G06F 1/16; G06F 1/187
USPC ....................................... 361/679.33, 679.38
See application file for complete search history.

(56) References Cited

U.S. PATENT DOCUMENTS

| 6,373,695 | B1 * | 4/2002 | Cheng ...................... 361/679.39 |
| 6,407,913 | B1 * | 6/2002 | Peachey et al. .......... 361/679.57 |
| 6,580,617 | B2 * | 6/2003 | Kao ............................... 361/759 |
| 7,778,017 | B2 * | 8/2010 | Huang ........................ 361/679.2 |
| 2003/0099094 | A1 * | 5/2003 | Coles et al. ................... 361/726 |
| 2009/0058236 | A1 | 3/2009 | Lin |
| 2009/0101781 | A1 * | 4/2009 | Peng et al. .................. 248/316.1 |
| 2012/0104222 | A1 | 5/2012 | Ding |

FOREIGN PATENT DOCUMENTS

TW 200911081 A 3/2009

* cited by examiner

*Primary Examiner* — Dion R Ferguson
*Assistant Examiner* — Mandeep Buttar
(74) *Attorney, Agent, or Firm* — Muncy, Geissler, Olds & Lowe, P.C.

(57) ABSTRACT

A fixing apparatus for a hard disk is disclosed. The fixing apparatus for a hard disk is used to accommodate a hard disk and includes a fixing bracket and a quick release device. The fixing bracket includes a first sidewall and a second sidewall, wherein the first sidewall and the second sidewall include a front perforation and a front fixed element, respectively. The quick release device includes a pair of resilient arms pivotally connected to the first sidewall and the second sidewall, respectively, so that each of the resilient arms can be rotated respectively relative to the first sidewall and the second sidewall to form a first state and a second state.

20 Claims, 6 Drawing Sheets

FIXING APPARATUS FOR A HARD DISK

BACKGROUND OF THE INVENTION

1. Field of the Invention

The present invention relates to a fixing apparatus for a hard disk; more particularly, the present invention relates to a fixing apparatus equipped with a rotatable resilient arm.

2. Description of the Related Art

Currently, much computer equipment has adopted the removable hard disk instead of the fixed hard disk of the past to allow the users of computer equipment, such as server users, to replace the hard disks of their computer equipment at their convenience. Each hard disk is pre-fixed in a fixing apparatus for a hard disk and placed in a loading bracket of the computer equipment along with the fixing apparatus for a hard disk, and the hard drive assembly is then fixed in the loading bracket by a fixing mechanism on the fixing apparatus for a hard disk. When it is necessary to replace the hard disk, the fixing apparatus for a hard disk and the hard disk can be pulled out from the loading bracket by the use of a handle or a quick release device installed on the fixing apparatus for a hard disk.

However, the quick release device of some current fixing apparatuses for hard disk includes a pair of resilient arms respectively installed on two sides of the fixing apparatus for a hard disk, while some of the resilient arms of the fixing apparatus for a hard disk are stationary. Therefore, when the resilient arms are assembled on the fixing bracket of the fixing apparatus for a hard disk, the resilient arms cover the screws for locking the hard disk and the screw holes on the fixing bracket. As a result, when users want to replace the hard disk and then remove the fixing apparatus for a hard disk from the loading bracket, they must loosen the screws directly with a screwdriver. However, the need to first remove the resilient arms in order to loosen the screws causes inconvenience to the users.

Therefore, there is a need to invent new fixing apparatuses for hard disks to solve the problems of the prior art.

SUMMARY OF THE INVENTION

It is an object of the present invention to provide a fixing apparatus for a hard disk with a rotatable quick release device.

To achieve the abovementioned objects, the fixing apparatus for a hard disk of the present invention is used to accommodate a hard disk with at least one installation hole on corresponding sides, such that the hard disk can be fixed in a loading bracket by the fixing apparatus for a hard disk. The fixing apparatus for a hard disk includes a fixing bracket and a quick release device. The fixing bracket is used to accommodate the hard disk and includes a first sidewall and a second sidewall corresponding to the first sidewall. The first sidewall and the second sidewall are respectively equipped with a front perforation and a front fixed element, and each front fixed element passes through the corresponding front perforation and is connected with the corresponding installation hole, respectively. The quick release device includes a pair of resilient arms, and each of the resilient arms is pivotally connected to the first sidewall and the second sidewall respectively, such that each of the resilient arms can rotate relative to the first sidewall and the second sidewall respectively to form a first state and a second state. In the first state, the resilient arms cover the front fixed element connected to the front perforation. In the second state, the resilient arms dodge and expose the front fixed element connected to the front perforation.

BRIEF DESCRIPTION OF THE DRAWINGS

These and other objects and advantages of the present invention will become apparent from the following description of the accompanying drawings, which disclose several embodiments of the present invention. It is to be understood that the drawings are to be used for purposes of illustration only, and not as a definition of the invention.

In the drawings, wherein similar reference numerals denote similar elements throughout the several views.

DETAILED DESCRIPTION OF THE PREFERRED EMBODIMENT

Figure 1:
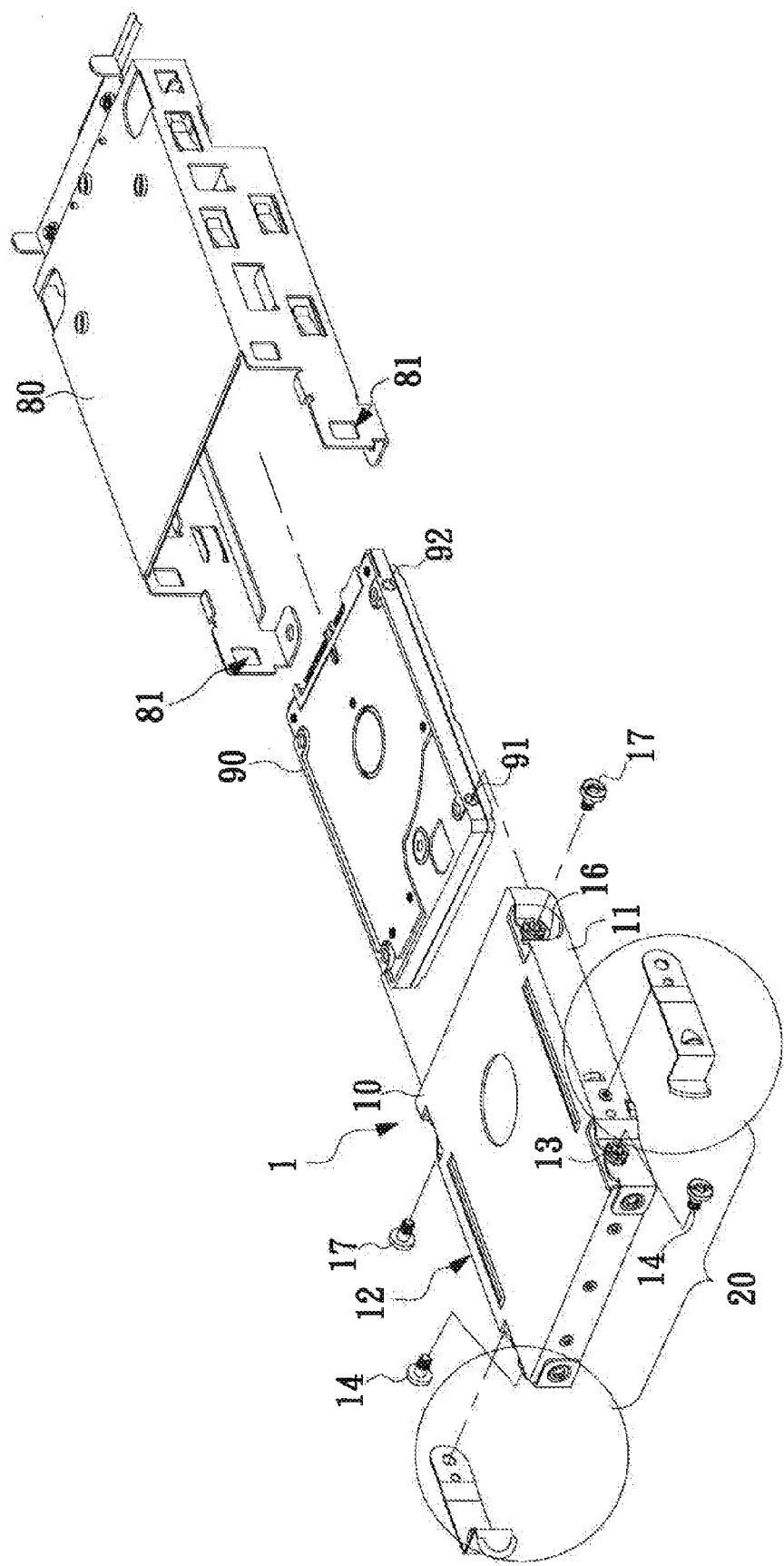
FIG. 1 is a decomposition schematic diagram of the fixing apparatus for a hard disk of the present invention.
Figure 2:
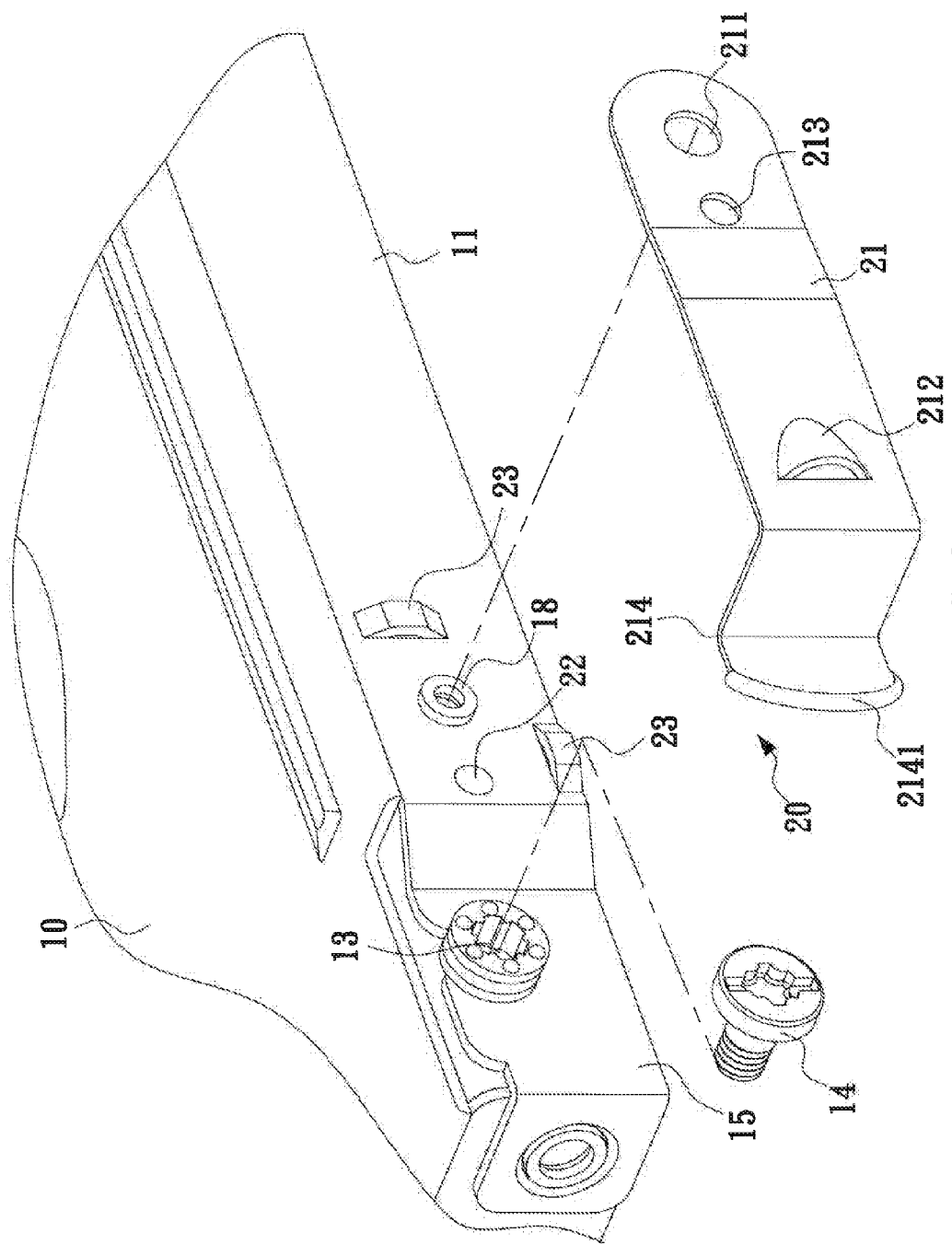
FIG. 2 is a partial enlarged schematic diagram of the fixing apparatus for a hard disk of the present invention.
Figure 3:
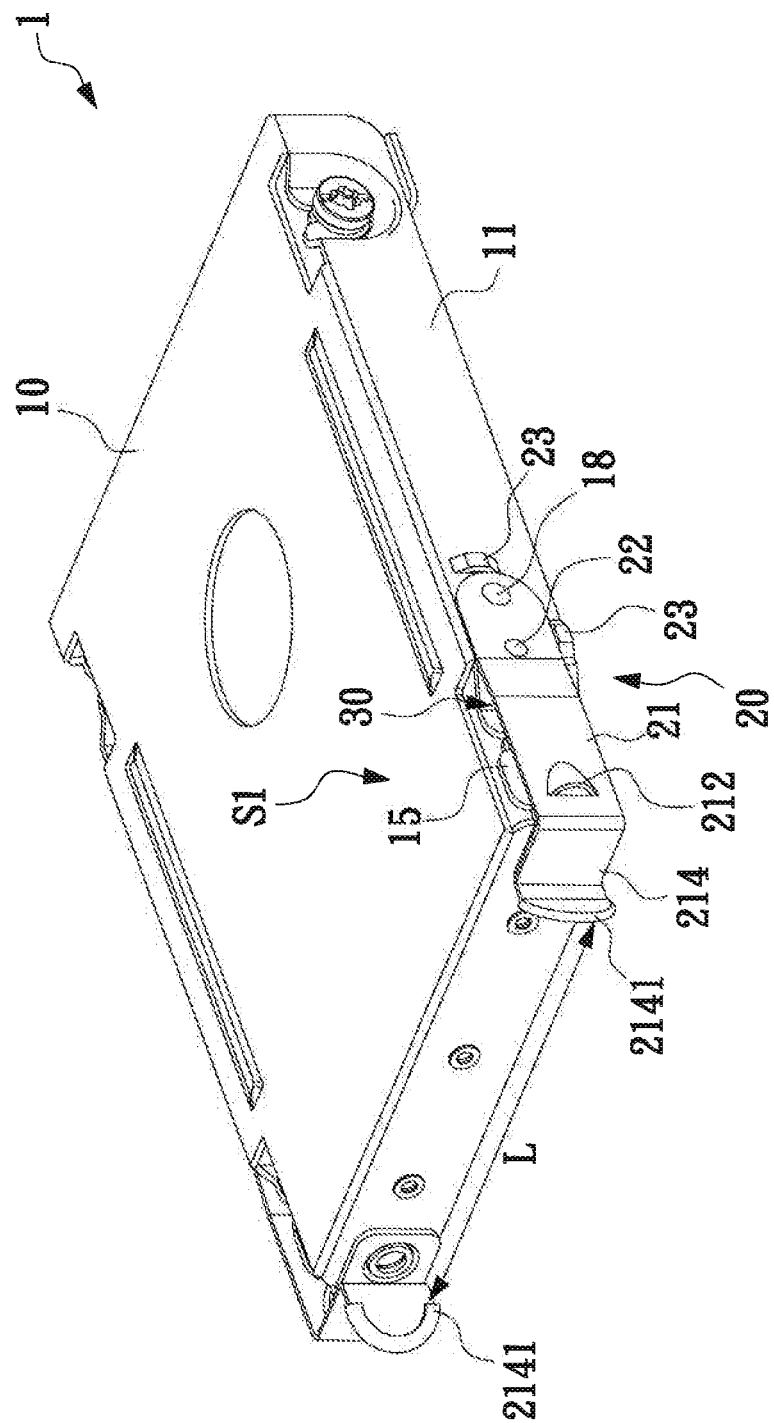
FIG. 3 is a schematic diagram of the resilient arm of the present invention in the first state.
Figure 4:
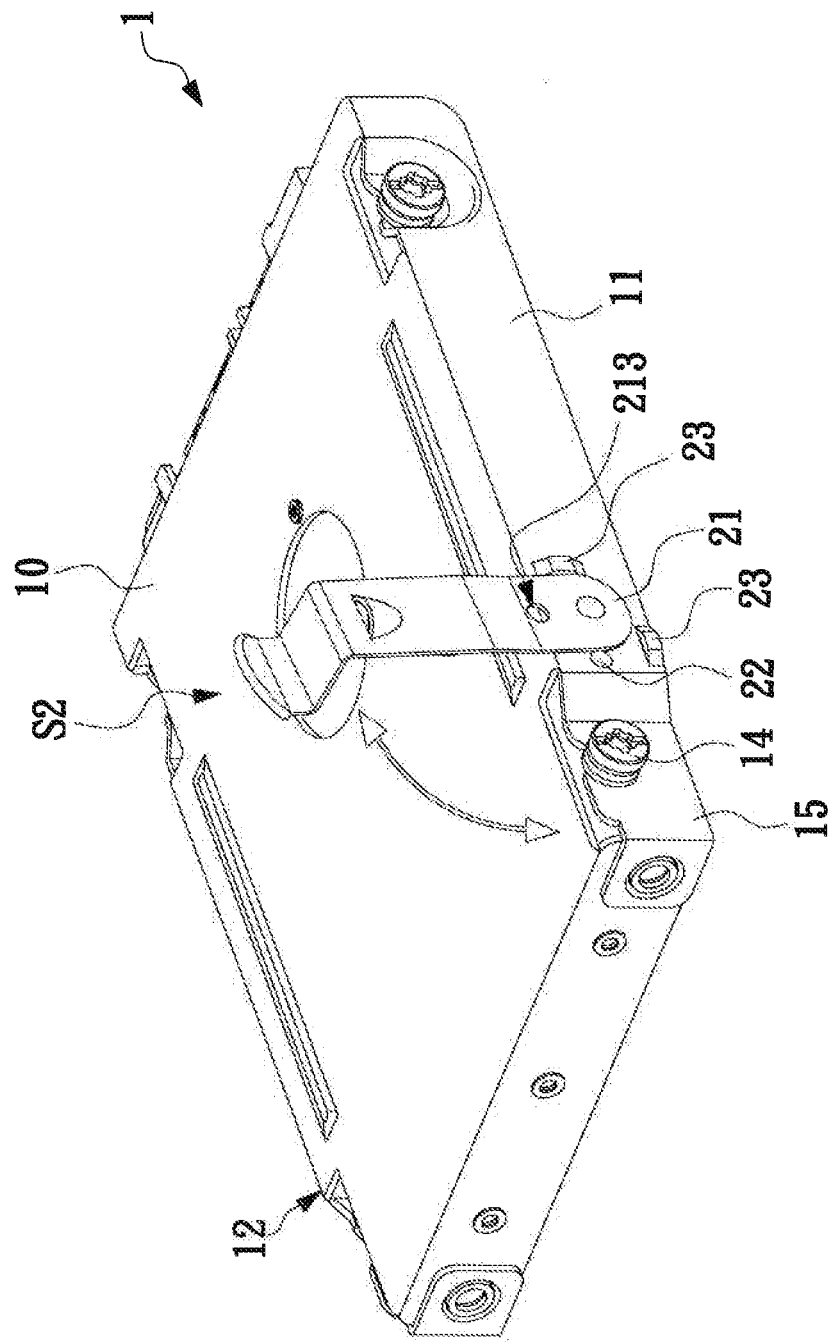
FIG. 4 is a schematic diagram of the resilient arm of the present invention in the second state.
Figure 5:
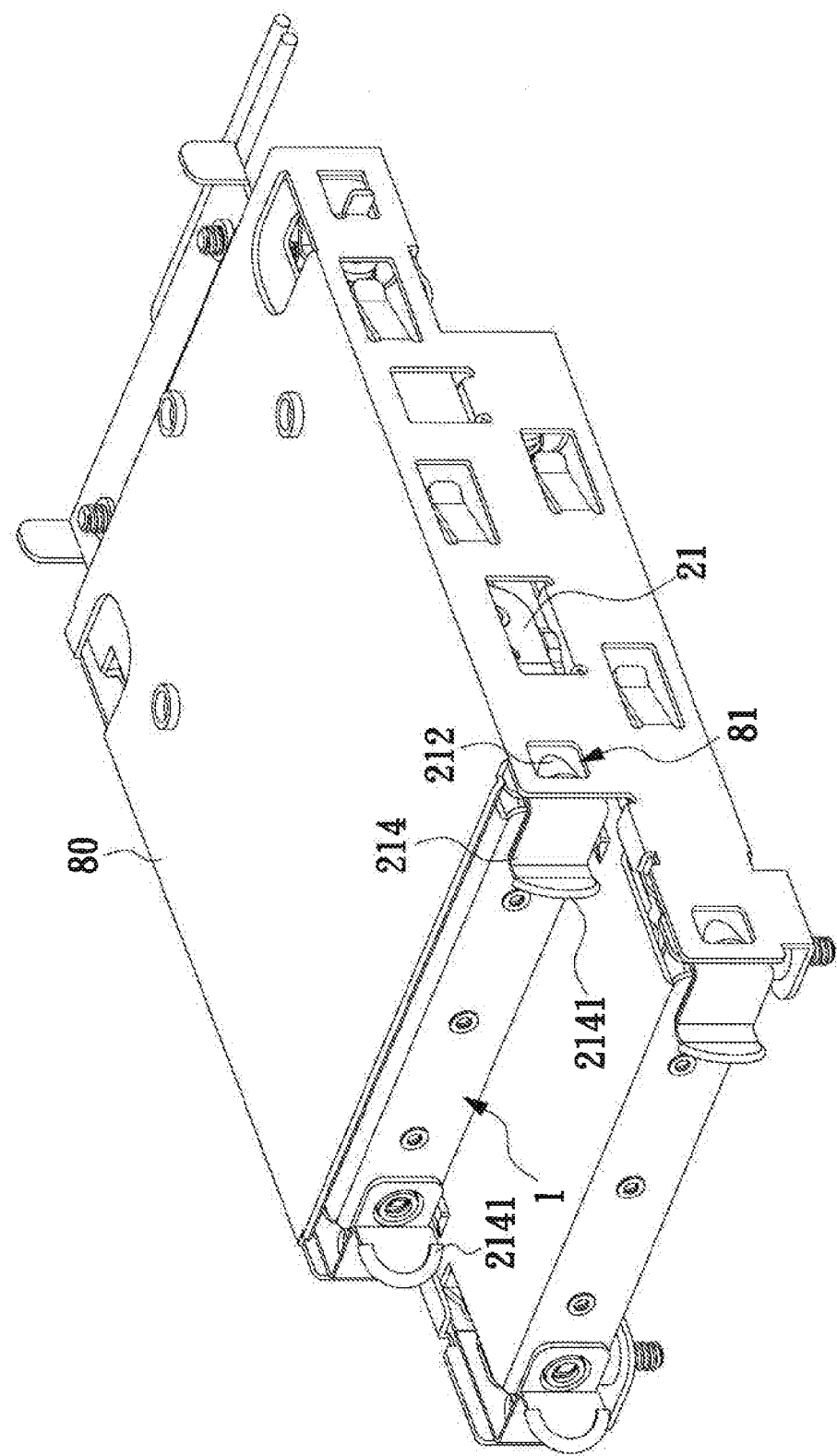
FIG. 5 is a schematic diagram of the fixing apparatus for a hard disk of the present invention fixed in the loading bracket.

Please refer to FIG. 1 to FIG. 5. FIG. 1 is a decomposition schematic diagram of the fixing apparatus for a hard disk of the present invention. FIG. 2 is a partial enlarged schematic diagram of the fixing apparatus for a hard disk of the present invention. FIG. 3 is a schematic diagram of the resilient arm of the present invention in the first state. FIG. 4 is a schematic diagram of the resilient arm of the present invention in the second state. FIG. 5 is a schematic diagram of the fixing apparatus for a hard disk of the present invention fixed in the loading bracket.

As shown in FIG. 1, in one embodiment of the invention, the fixing apparatus for a hard disk 1 can be used to accommodate a hard disk 90 such that the hard disk 90 can be fixed in a loading bracket 80 with a pair of retaining holes 81. Two corresponding sides of the hard disk 90 respectively include a front installation hole 91 and a rear installation hole 92 (the other side is not shown due to the perspective). The fixing apparatus for a hard disk 1 includes a fixing bracket 10 and a quick release device 20. In addition, the claim meaning of "hard disk" in this patent specification is not limited to a Hard Disk Drive (HDD). A Hybrid HDD integrated with a Solid State Drive (SSD) or other mechanical, optical, or electronic storage devices are also applicable to the structural design of the invention. In other word, the claim meaning of "hard disk" in this patent specification can be any storage medium. To facilitate explanation, the following detailed description and claims refer only to a "hard disk 90" as a representative example.

In one of the embodiments of the invention, the fixing bracket 10 is used to accommodate the hard disk 90. The fixing bracket 10 includes a first sidewall 11 and a second sidewall 12 in parallel corresponding to the first sidewall 11, a pair of front perforations 13 and rear perforations 16 respectively installed in the first sidewall 11 and the second sidewall 12, a front fixed element 14, a rear fixed element 17, and a shaft part 18 (the second sidewall 12 is not shown due to the perspective).

As shown in FIG. 1 and FIG. 2, there are concave parts 15 in the front of the first sidewall 11 and the second sidewall 12. When the hard disk 90 is placed in the fixing bracket 10, the front fixed element 14 and the rear fixed element 17 can respectively pass through the corresponding front perforation 13 and the rear perforation 16 to connect with the corresponding front installation hole 91 and rear installation hole 92 to fix the hard disk 90 in the fixing bracket 10.

In one of the embodiments of the invention, the quick release device 20 includes a pair of resilient arms 21, a pair of convex points 22, and two pair of stopper parts 23. Each of the resilient arms 21 includes a shaft perforation 211, a retaining part 212, a hole 213, and a compression side 214.

As shown in FIG. 3 and FIG. 4, in one of the embodiments of the invention, the shaft perforation 211 is passed through by the shaft part 18 and riveted to it, such that each of the resilient arms 21 is respectively connected to the first sidewall 11 and the second sidewall 12 and can be rotated relative to the first sidewall 11 and the second sidewall 12 in the axis of the shaft part 18 to forming a first state S1 and a second state S2. When the resilient arms 21 are in the first state S1, the resilient arms 21 cover the corresponding front perforation 13 and/or the front fixed element 14. When the resilient arms 21 are in the second state S2, the resilient arms 21 dodge and expose the corresponding front perforation 13 and/or the front fixed element 14, i.e. the resilient arms 21 do not cover the corresponding front perforation 13 and/or the front fixed element 14.

As shown in FIG. 5, the retaining part 212 is fixed to the corresponding retaining hole 81 when the fixing apparatus for a hard disk 1 is placed in the loading bracket 80, such that the fixing apparatus for a hard disk 1 can be fixed in the loading bracket 80. However, in design, the retaining hole 81 and retaining part 212 can also be oppositely installed in the reverse positions; i.e., the retaining part 212 can also be in the loading bracket 80, and the retaining hole 81 can be in the fixing apparatus for a hard disk 1.

As shown in FIG. 2 and FIG. 3, the hole 213 is used to retain the corresponding convex point 22 when the resilient arms 21 are in the first state S1, such that the resilient arms 21 are fixed via the connection of the convex points 22 and the holes 213 when the resilient arms 21 are in the first state S1.

As shown in FIG. 3, the compression sides 214 respectively protrude from the front side of the fixing bracket 10 instead of the first sidewall 11 and the second sidewall 12 when the resilient arms 21 are in the first state S1 so that users can apply pressure to them. In one specific embodiment of the invention, the shape of the compression side 214 is L-shaped, including a compression part 2141 located at one end of the L-shaped compression side 214. The distance between the two compression parts 2141 (i.e., the L as shown in FIG. 3) is less than the distance between the first sidewall 11 and the second sidewall 12 (i.e., less than the width of the fixing bracket 10), to allow users to easily apply pressure and pull out the hard disk assembly with one hand.

In one embodiment of the invention, the resilient arms 21 are made of metallic materials. The reason why metallic materials are chosen is mainly that in plastic injection, plastic parts require a certain minimum thickness. Therefore, choosing a metal with a thinner forming thickness for the resilient arms 21 of the invention can reduce the width of the fixing apparatus for a hard disk 1 to meet the needs of miniaturization. In addition, since the metallic material is conductive, it can also be used to reduce electromagnetic interference.

As shown in FIG. 2, in one embodiment of the invention, two pairs of stopper parts 23 are respectively mounted in the first sidewall 11 and the second side wall 12 (the second sidewall 12 is not shown due to the perspective), and the set direction of the two stopper parts 23 mounted in the same side wall is mutually vertical to form a limiting space between the two stopper parts 23 to limit the margin of rotation of the resilient arms 21 via the resistance of two stopper parts 23; in other words, the limiting spaces limit the amount of rotation of the resilient arms 21. In one specific embodiment of the invention, the limiting space of the invention limits the rotation of the resilient arms 21 to substantially not greater than 90 degrees, but this is not a limitation of the present invention.

Figure 6:
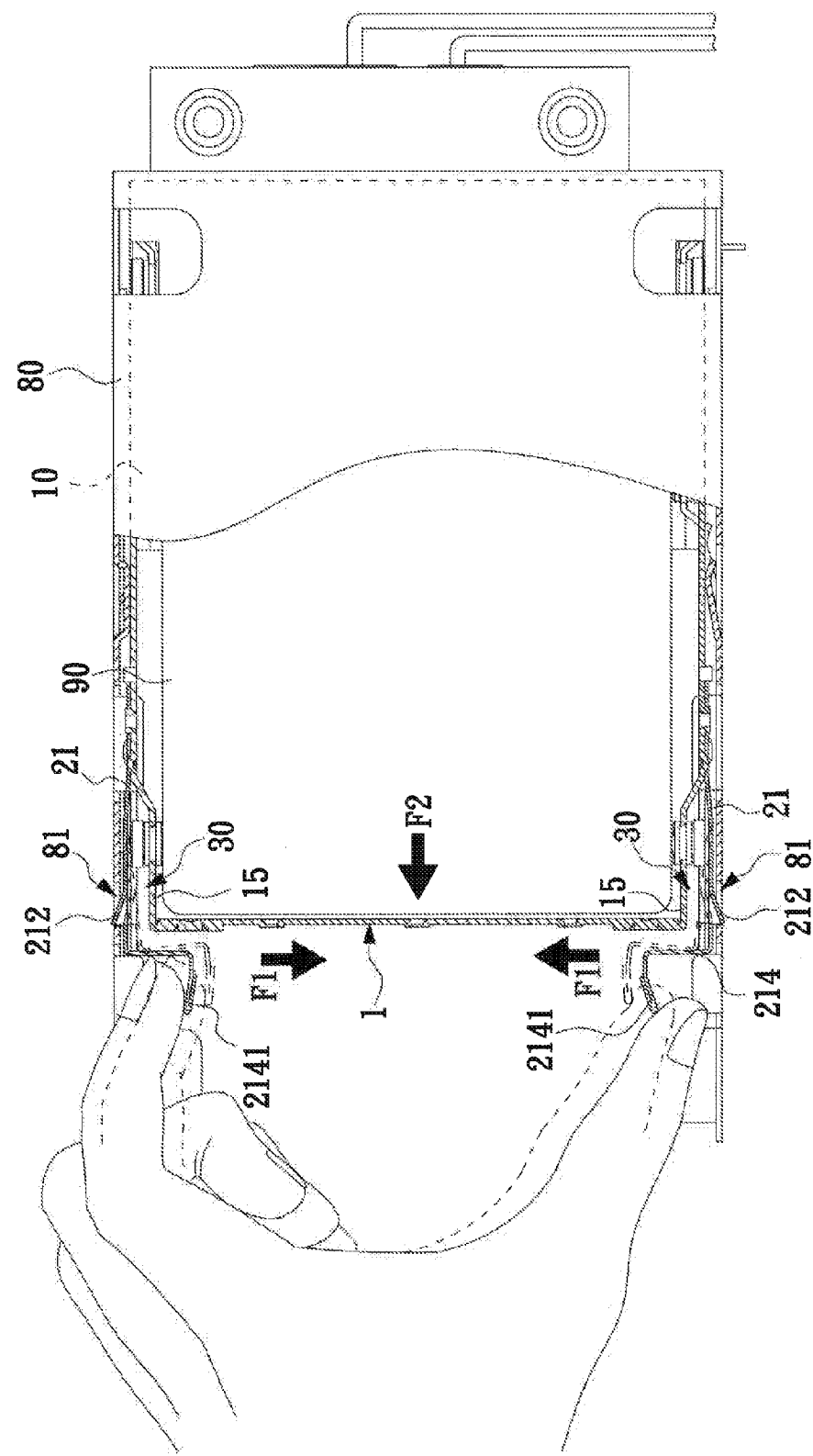
FIG. 6 is a process schematic diagram of removing the fixing apparatus for a hard disk of the present invention from the loading bracket.

Please refer to FIG. 5 and FIG. 6. FIG. 6 is the process schematic diagram of removing the fixing apparatus for a hard disk from the loading bracket.

As shown in FIG. 5, when the fixing apparatus for a hard disk 1 is placed in the loading bracket 80, the retaining part 212 of the resilient arms 21 can be retained in the retaining hole 81 of the loading bracket 80 such that the fixing apparatus for a hard disk 1 can be fixed in the loading bracket 80. As shown in FIG. 6, when each of the resilient arms 21 is in the first state S1, a compression space 30 exists between the resilient arms 21 and the concave part 15 of the first sidewall 11 and the second sidewall 12, such that the compression space 30 can accommodate the pressed parts of the resilient arms 21 when users press the resilient arms 21 (as shown by the arrow F1 direction of FIG. 6). When the resilient arms 21 are pressed inward, the retaining part 212, originally retained in the retaining hole 81, will exit the retaining hole 81 (as shown by the dotted lines of FIG. 6). After removing the retaining state, the user can easily remove the fixing apparatus for a hard disk 1 from the loading bracket 80 (as shown by the arrow F2 direction of FIG. 6).

Accordingly, the quick release device 20 equipped in the fixing apparatus for a hard disk 1 of the present invention not only facilitates users to quickly remove the fixing apparatus for a hard disk 1 from the loading bracket 80 but also facilitates users to directly loosen the front fixed element 14 without removing the resilient arms 21, by rotating the resilient arms 21 from the horizontal first state S1 shown in FIG. 3 to the vertical second state S2 shown in FIG. 4. In this situation, the front fixed element 14 originally covered by the resilient arms 21 can be exposed to achieve the purpose of facilitating the removal or fixing of the hard disk 90 and solve the problems of the prior art.

Please note that the above embodiments are just preferred embodiments of the present invention and are not intended to limit the scope of the present invention. It is understandable to those skilled in the art that the abovementioned elements are not all essential elements. Further, in order to implement the present invention, other detailed known elements might be included as well. Each element can be omitted or modified according to different needs.

In summary, regardless of purposes, means and effectiveness, this invention is quite different from the known technology and should merit the issuing of a new patent. However, it is noted that many of the above-mentioned embodiments are only for illustrative purposes; the claims of the invention should depend on the claims and not be limited to the embodiments.

What is claimed is:

1. A fixing apparatus for a hard disk used to accommodate the hard disk having at least one installation hole respectively on each corresponding side thereof so that the hard disk is fixed in a loading bracket by the fixing apparatus, comprising:

a fixing bracket used to accommodate the hard disk and comprising a first sidewall and a second sidewall corresponding to the first sidewall, wherein the first sidewall and the second sidewall are equipped with a front perforation and a front fixed element, respectively; each of front fixed element respectively connects with the corresponding installation hole via the corresponding front perforation; and a quick release device comprising a pair of resilient arms pivotally connected to the first sidewall and the second sidewall respectively, such that each of the resilient arms is respectively capable of rotating on a plane which substantially parallels with the first sidewall and the second sidewall to form a first state and a second state, wherein in the first state, the resilient arms cover the front fixed element connected to the front perforation, and in the second state, the resilient arms dodge and expose the front fixed element connected to the front perforation.

2. The fixing apparatus for a hard disk as claimed in claim 1, wherein the pair of resilient arms is made of metallic materials.

3. The fixing apparatus for a hard disk as claimed in claim 1, wherein the pair of resilient arms respectively comprises a compression side; when the pair of resilient arms is in the first state, the pair of compression sides protrude from the other side of the fixing bracket instead of from the first sidewall and the second sidewall.

4. The fixing apparatus for a hard disk as claimed in claim 3, wherein each compression side comprises a compression part, and the distance between the two compression parts is less than the distance between the first sidewall and the second sidewall.

5. The fixing apparatus for a hard disk as claimed in claim 1, wherein the quick release device comprises a pair of convex points respectively installed in the first sidewall and the second sidewall, and the pair of resilient arms respectively comprise holes; the pair of convex points are fixed in the corresponding holes when the pair of resilient arms are in the first state.

6. The fixing apparatus for a hard disk as claimed in claim 1, wherein the first sidewall and the second sidewall respectively comprise a concave part used for forming a compression space between the each concave part and the corresponding resilient arm when the pair of resilient arms are in the first state.

7. The fixing apparatus for a hard disk as claimed in claim 1, wherein the quick release device comprises at least one pair of stopper parts respectively installed in the first sidewall and the second sidewall.

8. The fixing apparatus for a hard disk as claimed in claim 7, wherein the number of the at least one pair of stopper parts is two pairs, and two stopper parts in the same sidewall are used for forming a limiting space to limit the rotation of each of the resilient arms.

9. The fixing apparatus for a hard disk as claimed in claim 8, wherein the limiting space limits the rotation of the resilient arms substantially to no greater than 90 degrees.

10. The fixing apparatus for a hard disk as claimed in claim 1, wherein the first sidewall and the second sidewall are respectively equipped with a shaft part, and the pair of resilient arms respectively comprise a shaft perforation; each shaft perforation is used to make each shaft part install in itself, such that each resilient arm is pivotally connected to the first sidewall and the second sidewall.

11. A fixing apparatus for a storage medium used to accommodate the storage medium having at least one installation hole respectively on each corresponding side thereof so that the storage medium is fixed in a loading bracket by the fixing apparatus, comprising:

a fixing bracket used to accommodate the storage medium and comprising a first sidewall and a second sidewall corresponding to the first sidewall, wherein the first sidewall and the second sidewall are equipped with a perforation and a fixed element, respectively; each fixed element respectively connects with the corresponding installation hole via the corresponding perforation; and a quick release device comprising a pair of resilient arms pivotally connected to the first sidewall and the second sidewall respectively, such that each of the resilient arms is respectively capable of rotating on a plane which substantially parallels with the first sidewall and the second sidewall to form a first state and a second state, wherein in the first state, the resilient arms cover the fixed element connected to the perforation, and in the second state, the resilient arms dodge and expose the fixed element connected to the perforation.

12. The fixing apparatus for a storage medium as claimed in claim 11, wherein the pair of resilient arms is made of metallic materials.

13. The fixing apparatus for a storage medium as claimed in claim 11, wherein the pair of resilient arms respectively comprises a compression side; when the pair of resilient arms is in the first state, the pair of compression sides protrude from the other side of the fixing bracket instead of from the first sidewall and the second sidewall.

14. The fixing apparatus for a storage medium as claimed in claim 13, wherein each compression side comprises a compression part, and the distance between the two compression parts is less than the distance between the first sidewall and the second sidewall.

15. The fixing apparatus for a storage medium as claimed in claim 11, wherein the quick release device comprises a pair of convex points respectively installed in the first sidewall and the second sidewall, and the pair of resilient arms respectively comprise holes; the pair of convex points are fixed in the corresponding holes when the pair of resilient arms are in the first state.

16. The fixing apparatus for a storage medium as claimed in claim 11, wherein the first sidewall and the second sidewall respectively comprise a concave part used for forming a compression space between the each concave part and the corresponding resilient arm when the pair of resilient arms are in the first state.

17. The fixing apparatus for a storage medium as claimed in claim 11, wherein the quick release device comprises at least one pair of stopper parts respectively installed in the first sidewall and the second sidewall.

18. The fixing apparatus for a storage medium as claimed in claim 17, wherein the number of the at least one pair of stopper parts is two pairs, and two stopper parts in the same sidewall are used for forming a limiting space to limit the rotation of each of the resilient arms.

19. The fixing apparatus for a storage medium as claimed in claim 18, wherein the limiting space limits the rotation of the resilient arms substantially to no greater than 90 degrees.

20. The fixing apparatus for a storage medium as claimed in claim 11, wherein the first sidewall and the second sidewall are respectively equipped with a shaft part, and the pair of resilient arms respectively comprise a shaft perforation; each shaft perforation is used to make each shaft part install in itself, such that each resilient arm is pivotally connected to the first sidewall and the second sidewall.

* * * * *